(12) United States Patent
Ahmadzadeh et al.

(10) Patent No.: US 9,544,798 B1
(45) Date of Patent: Jan. 10, 2017

(54) PROFILING ROGUE ACCESS POINTS

(71) Applicant: QUALCOMM Incorporated, San Diego, CA (US)

(72) Inventors: Seyed Ali Ahmadzadeh, Santa Clara, CA (US); Saumitra Mohan Das, Santa Clara, CA (US); Rajarshi Gupta, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/806,811

(22) Filed: Jul. 23, 2015

(51) Int. Cl.
*H04W 24/00* (2009.01)
*H04W 24/08* (2009.01)
*H04W 12/12* (2009.01)

(52) U.S. Cl.
CPC ............ *H04W 24/08* (2013.01); *H04W 12/12* (2013.01)

(58) Field of Classification Search
CPC ............ H04L 63/1466; H04L 63/1416; H04L 63/1433; H04L 63/12; H04L 63/126; H04L 63/14; H04L 63/1408; H04W 12/12; H04W 24/08; H04W 4/02; H04W 88/08; H04W 12/10; H04W 12/06; G06F 21/577
USPC ........... 455/424, 62, 524; 370/445, 320, 401
See application file for complete search history.

(56) References Cited

U.S. PATENT DOCUMENTS

| | | | |
|---|---|---|---|
| 7,340,768 B2 | 3/2008 | Rosenberger | |
| 7,346,338 B1 * | 3/2008 | Calhoun | H04L 63/1408 455/410 |
| 7,370,362 B2 * | 5/2008 | Olson | H04L 63/1433 726/25 |
| 7,486,666 B2 * | 2/2009 | Meyer | H04L 63/101 370/352 |
| 7,716,740 B2 * | 5/2010 | Robert | H04L 63/1408 455/410 |
| 8,000,698 B2 * | 8/2011 | Wolman | H04L 63/1408 455/410 |
| 8,655,312 B2 | 2/2014 | Stahlberg et al. | |
| 8,750,267 B2 | 6/2014 | Aggarwal et al. | |
| 8,949,993 B2 | 2/2015 | Basavapatna et al. | |

(Continued)

OTHER PUBLICATIONS

Gopinath K. N., et al., "All You Wanted to Know About WiFi Rogue Access Points", a quick reference to Rogue AP security threat, Rogue AP detection and mitigation, AirTight Networks, 2009, 21 pages.

(Continued)

*Primary Examiner* — Mahendra Patel
(74) *Attorney, Agent, or Firm* — The Marbury Law Group, PLLC

(57) ABSTRACT

Various aspects include methods for profiling access points for a mobile communication device that includes a modem controlling a first radio access technology (RAT) and a second RAT. The device modem may establish a first level of communications with a potential network access point and obtain a first set of observed parameters of the potential network access point through the first level of communications. The modem may determine whether the first set of observed parameters of the potential network access point matches expected parameters for a network access point, and establish a second level of communications with the potential network access point in response to determining that the first set of observed parameters matches expected parameters of the network access point.

30 Claims, 11 Drawing Sheets

(56) References Cited

U.S. PATENT DOCUMENTS

| | | | |
|---|---|---|---|
| 2004/0107219 A1* | 6/2004 | Rosenberger | H04L 12/2602 |
| 2005/0060576 A1 | 3/2005 | Kime et al. | |
| 2006/0164969 A1* | 7/2006 | Malik | H04B 7/0408 |
| | | | 370/203 |
| 2007/0286143 A1* | 12/2007 | Olson | H04L 63/1433 |
| | | | 370/338 |
| 2011/0208866 A1 | 8/2011 | Marmolejo-Meillon et al. | |
| 2013/0083661 A1* | 4/2013 | Gupta | H04W 4/005 |
| | | | 370/235 |
| 2014/0341182 A1* | 11/2014 | Gage | H04W 12/04 |
| | | | 370/331 |
| 2015/0189511 A1 | 7/2015 | Lapidous | |
| 2015/0271690 A1* | 9/2015 | Vashi | H04W 88/06 |
| | | | 370/328 |

OTHER PUBLICATIONS

Hall J., "Detection of Rogue Devices in Wireless Networks," Aug. 2006, 294 Pages.
Liebsch, et al., "Candidate Access Router Discovery", The Internet Society, Jul. 2005, pp. 1-46.
Mojo Wireless., "Ugly, Bad and Good of Wireless Rogue Access Point Detection" Sep. 20, 2009., pp. 1-5, Retrieved from the Internet: http://blog.airtightnetworks.com/ugly-bad-and-good-of-wireless-rogue-access-point-detection/.
International Search Report and Written Opinion—PCT/US2016/039298—ISA/EPO—Sep. 16, 2016.

* cited by examiner

PROFILING ROGUE ACCESS POINTS

BACKGROUND

Mobile communication devices, such as cellular phones and tablets, may connect to a variety of different networks to acquire voice and data service. A mobile communication device may connect to a network access point to gain access to communication networks. Network access points (access points) are devices that facilitate a wired or wireless connection between devices and a wider network such as the Internet. For example, mobile communication devices may connect to a WiFi® hotspot access point in order to connect to the Internet. access points may include personal access points located within a home, enterprise access points for providing access to an enterprise network (e.g., an internal business network), and public access points for use by the general public (e.g., library, airport, or coffee shop hotspots).

As the popularity of network access points increases, so has the risk of encountering rogue access points. Rogue access points are access points that masquerade as legitimate access points but are controlled by a malicious entity or person. Rogue access points usually masquerade as trusted access points to trick a user into connecting to the rogue access point, for example by using an access point name that resembles a trusted access point name. When a user on a mobile communication device connects to a rogue access point, the rogue access point may be able to obtain personal information from the user (e.g., keystrokes, credit card information, login credentials), redirect uniform resource locator (URL) requests from the mobile communication device, install malware, and/or take other negative actions that harm the mobile communication device or the user. The user may not realize that the computing device is connected to a rogue access point for a long time. Software or applications that can be used to detect rogue access points usually require the mobile communication device to connect to the rogue access point first. This means that the mobile communication device, and especially the high level operating system and applications, are exposed to the rogue access point for some time before the rogue access point is detected and the connection severed. In addition, monitoring for rogue access points may consume a significant amount of battery power of a mobile communication device.

SUMMARY

Various aspects include methods and mobile communication devices implementing methods for profiling access points for a mobile communication device including a modem controlling a first radio access technology (RAT) and a second RAT. Various aspects may include establishing, by the modem, a first level of communications with a potential network access point, obtaining, by the modem, a first set of observed parameters of the potential network access point through the first level of communications, determining, by the modem, whether the first set of observed parameters of the potential network access point matches expected parameters for a network access point, and establishing, by the modem, a second level of communications with the potential network access point in response to determining that the first set of observed parameters matches expected parameters of the network access point.

In some aspects, the first level of communications may include communication between only the modem and the potential network access point and the second level of communications may include communication between an application or operating system executing on the mobile communication device and the potential network access point. In some aspects, the method may further include restricting, by the modem, access to the potential network access point in response to determining that the first set of observed parameters does not match expected parameters of the network access point.

In some aspects, the method may further include obtaining, by the modem, a second set of observed parameters of the potential network access point through the second level of communications, determining, by the modem, whether the second set of observed parameters matches expected parameters of the network access point, and establishing, by the modem, a third level of communications with the potential network access point in response to determining that the second set of observed parameters matches expected parameters of the network access point. In such aspects, obtaining a second set of observed parameters of the potential network access point through the second level of communications may be triggered by a change in behavior by the potential network access point. In such aspects, the method may further include restricting, by the modem, access to the potential network access point in response to determining that the second set of observed parameters does not match expected parameters of the network access point.

In some aspects, the method may further include accessing, by the modem, expected parameters for the network access point from a profile database that stores a plurality of profiles of expected parameters for different network access points, and determining whether the first set of observed parameters matches expected parameters for a network access point may further include selecting a first profile from the plurality of profiles based on an identifier of the potential network access point, and comparing the first set of observed parameters to a corresponding set of expected parameters in the first profile. In such aspects, the method may further include updating, by the modem, the profile database based on the first set of observed parameters. In such aspects, the profile database may be stored on the mobile communication device.

In some aspects, expected parameters for a network access point may include at least one of an environmental characteristic, response delay, processing time access point name, round trip time, a rate switch mode, a security configuration, a firewall configuration, a network access configuration, a supported technology, an operational parameter, a channel characteristic, an environmental characteristic, response delay, processing time, and an up-time. In some aspects, the first RAT is configured to communicate with a wide area network and the second RAT is configured to communicate with a local area network, and communications with a wide area wireless network may be maintained using the first RAT at least until the second level of communications is established with the potential network access point via the second RAT, and the second RAT may be used by the modem to obtain the first set of observed parameters of the potential network access point through the first level of communications.

In some aspects, the method may further include generating, by the modem, a behavior vector based on the obtained first set of observed parameters of the potential network access point and in which determining, by the modem, whether the first set of observed parameters of the potential network access point matches expected parameters for a network access point may include applying the behavior vector to a classifier model that is based on expected parameters for the network access point.

Various aspects further include a mobile communication device having a radio frequency (RF) resource and a modem coupled to the RF resource and configured with processor executable instructions to perform operations of the methods described herein. Various aspects include a mobile communication device having means for performing functions of the methods described herein. Various aspects include a non-transitory processor-readable storage medium having stored thereon processor-executable instructions configured to cause a modem of a mobile communication device to perform operations of the methods described herein.

BRIEF DESCRIPTION OF THE DRAWINGS

The accompanying drawings, which are incorporated herein and constitute part of this specification, illustrate exemplary aspects, and together with the general description given above and the detailed description given below, serve to explain the features of the disclosed systems and methods.

DETAILED DESCRIPTION

Figure 1:
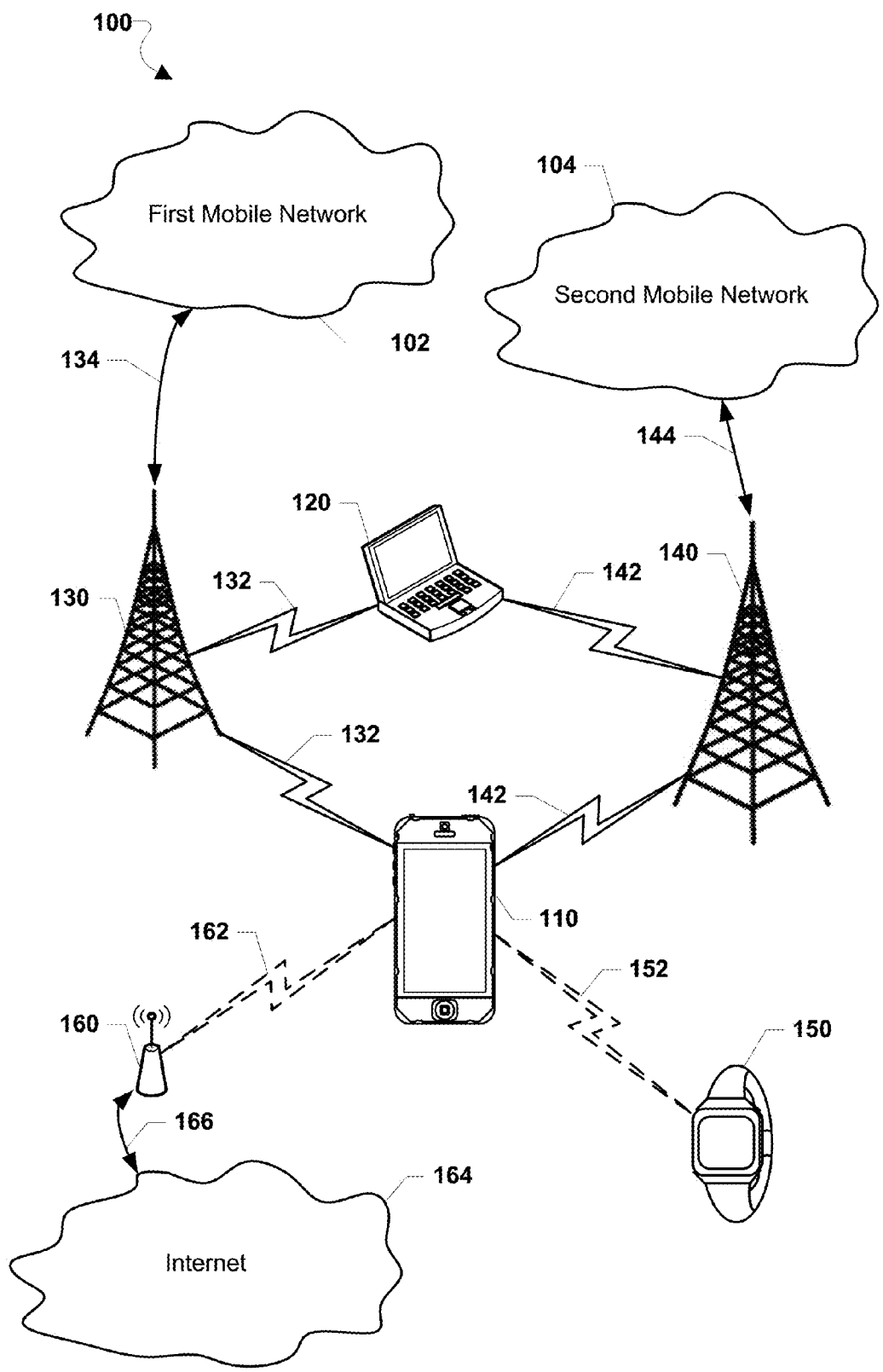
FIG. 1 is a communication system block diagram of mobile telephony networks suitable for use with various aspects.

Various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the written description or the claims.

As used herein, the term "mobile communication device," "communication device," or "mobile device" refers to any one or all of cellular telephones, smart phones, personal or mobile multi-media players, personal data assistants, laptop computers, tablet computers, smart books, palm-top computers, wireless electronic mail receivers, multimedia Internet-enabled cellular telephones, wireless gaming controllers, and similar personal electronic devices that includes a programmable processor, memory, and circuitry for connecting to one or more mobile communication networks with one or more shared RF resources. Various aspects may be useful in mobile communication devices, such as smart phones, which through their mobility may encounter several wireless access points during a day, and so such devices are referred to in the descriptions of various aspects.

Rogue access points are an increasing problem as more and more people utilize mobile communication devices to connect to wireless networks like the Internet via wireless access points, such as WiFi "hotspots." Rogue access points may be wireless devices, such as WiFi routers and/or computing devices coupled to such wireless devices, that emulate the behavior of a normal access point. For example, rogue access points may broadcast themselves as an access point to various devices in the vicinity, and spoof or mimic legitimate access points. When a user connects to the network through the rogue access point, the rogue access point may act like a malicious middle layer between the mobile communication device and the network. Actions taken by the rogue access point may include URL redirection, installing malware on the mobile communication device, and stealing personal and device information. Users may be unaware for a long time, if at all, that they are using a malicious access point.

Current rogue access point detection usually includes methods of continuous monitoring of an access point or of network traffic, or validating communications using a trusted third party. In addition, applications on the mobile communication device may be used to monitor access points. However, these methods may consume a lot of battery power on the mobile communication device and usually require the mobile communication device to first connect to the access point before monitoring begins. It is preferable to be able to detect rogue access points before connecting to them, while also saving the battery power on the mobile communication device.

In overview, various aspects provide methods implemented with a modem processor of a mobile communication device to detect rogue access points and take corrective actions. A mobile communication device according to various aspects may include one or more modems that control two or more radio access technologies (RATs). A first RAT may be configured to communicate through a wireless wide area network (WWAN), including cellular network technologies such as Third Generation (3G), Fourth Generation (4G), Long Term Evolution (LTE), Time Division Multiple Access (TDMA), Frequency Division Multiple Access (FDMA), Code Division Multiple Access (CDMA), Wideband CDMA (WCDMA), Global System for Mobile Communications (GSM), and Universal Mobile Telecommunications Systems (UMTS). A second RAT may be configured to communicate through a wireless local area network (WLAN), such as a WiFi® hotspot or other localized network access point. In various aspects, a mobile communication device may leverage the first RAT to communicate via a WWAN while incrementally evaluating a wireless access point via the second RAT. In this manner, an access point may be evaluated tiered profiling approach without requiring a full connection, while the mobile communication device is able to communicate via the WWAN. In some aspects, the methods may be implemented within a modem system on chip (SoC), enabling evaluation of access points while the mobile communication device is in a low power mode. In some aspects, an access point may be evaluated by generating a behavior vector of observed access point activities and behaviors and applying the behavior vector to an access point behavior classification model.

In various aspects, a mobile communication device may access a profile database that includes a number of profiles corresponding to a number of trusted network access points. The profile database may be stored on the mobile communication device or may be stored on a remote server that is accessible to the mobile communication device. Each profile may include a number of expected parameters associated with a particular network access point. The parameters define the expected characteristics or behavior of known network access points, and may be used to uniquely identify a network access point. Thus, a rogue access point may be distinguishable from a trusted access point because the rogue access point cannot mimic all expected parameters of the trusted access point. The parameters may be obtained from previous interactions of the mobile communication device with trusted access points, or may be obtained by a remote server that aggregates parameter information from multiple devices. The parameters may include, but are not limited to, an access point name, up-time of the access point, the round trip time between a request sent from the device and a response from the access point, a rate switch mode, security configurations (e.g., implemented encryption or hash function), firewall or network access configurations (e.g., open ports, use of demilitarized zone (DMZ), default gateway, Internet protocol (IP) address subnet, network address translation scheme, path information to a specific server (hope count, delay route)), supported technologies (e.g., 801.11 a/b/g/n/ac), operational parameters (e.g., short interframe space, distributed interframe space, maximum retry count, preamble size, max protocol data unit size, multiple protocol data unit support, $W_{min}$, $W_{max}$), and channel or environmental characteristics (e.g., basic service set load, channel load, error rate, throughput, identity of neighbor access points or WWANs, location information, AP response time to client requests and messages).

A modem processor of the mobile communication device may identify a potential network access point for the device. The modem may establish a first level of communication between the potential network access point and the second RAT. The first level of communication may be conducted independently of the high level operating system or any applications executing on the mobile communication device. This isolates the interaction between the mobile communication device and the potential network access point. In other words, the modem processor and the second RAT may quarantine itself from the rest of the device when first communicating with the potential network access point. This prevents the potential access point from receiving traffic from higher levels of software in the mobile communication device before determining whether the access point can be trusted. It may also reduce the power consumed because the higher level components of the mobile communication device are not used. The first level of communication may be a limited level of communication, such as complete passive reception of information broadcast from the potential network access point or requests for certain specific information about the potential network access point.

The modem processor may obtain a set of observed parameters of the potential network access point through the first level of communication. The set of observed parameters may be a subset of expected parameters stored in the profile database. The modem processor may then determine whether the set of observed parameters obtained from the potential network access point matches the corresponding expected parameters of a profile in the profile database. In other words, the observed parameters may be used to determine whether the potential network access point has the expected characteristics of a trusted access point or class of trusted access points in the profile database. The profile database may be indexed by a unique identifier for each access point or class of access points, such as a medium access control (MAC) address. The comparison of observed parameters and expected parameters may include comparing a value of each observed parameter with the expected value or range of expected values stored in the profile database. The comparison may also include generating a risk or trust indicator based on the degree to which the observed parameters match expected parameters, for example by converting the observed and expected parameters into eigenvector form and using matrix multiplication to derive an eigenvalue representing a risk or trust indicator. The indicator may be compared to a threshold value to determine whether the potential network access point is sufficiently trustworthy.

When a match is found, the modem processor may establish a second level of communication between the potential network access point and the second RAT. In other words, after the modem uses the first level of communication to verify a certain level of trust of the potential network access point, the modem may then open up communication using the second RAT (e.g., a RAT configured for WLAN communications). The second level of communication may involve the operating system and applications executing on the mobile communication device in addition to the modem. The modem processor may also update the profile database with the observed parameters, for example to obtain an updated range or average for a numerical parameter.

The modem processor may obtain more observed parameters from the potential network access point through the second level of communication, and again compare the observed parameters to the corresponding profile in the profile database. If the observed parameters still match expected parameters, the modem processor may maintain the second level of communication or move to a third, higher level of communication. In this manner, the modem processor may implement a tiered profiling approach in which higher communication levels are allowed with the potential network access point if the access point continues to behave as expected according to the profile database. In addition, less battery power is consumed at lower tiers of trust because the modem processor establishes only the first level of communication with the potential network access point to verify it as trustworthy.

If at any point the observed parameters of the potential network access point do not match expected parameters in the profile database, the modem may take steps to restrict access to the potential network access point. For example, the modem processor may blacklist the potential network access point, may prevent access to the potential network access point by the high level operating system and applications, may disconnect from the potential network access point if already connected, may block communications to or from the potential network access point, or other protective actions.

In an aspect, the observations and classifications of an access point may be accomplished within a behavior analysis system implemented within a processor of a mobile communication device, such as within a modem SoC. A processor of a mobile communication device may be configured with a behavioral analysis system that may include a behavior observer module and a behavior analyzer module, with the behavior observer module and/or the behavior analyzer configured to observe and analyze behaviors of access points. The behavior observer module may be configured to observe behaviors of interactions with an access point (e.g., messaging, instructions, data transformations, frequency of communications, etc.), such as via a profiling engine, in order to monitor the behavior (e.g., activities, conditions, operations, and events) of an access point. The behavior observer module may collect behavior information pertaining to the observed module and may store the collected information in a memory (e.g., in a log file, etc.), and a behavior extractor may transform the log of actions into behavior vectors. In the various aspects, the analyzer module may apply the generated behavior vectors to a classifier model to classify the behavior of the observed access point, such as whether the access point is legitimate or is behaving anomalously.

Each behavior vector may be a data structure or an information structure that includes or encapsulates one or more features. A behavior vector may include an abstract number or symbol that represents all or a portion of observed access point behaviors that are observed. Each feature may be associated with a data type that identifies a range of possible values, operations that may be performed on those values, the meanings of the values, and other similar information. The data type may be used to determine how the corresponding feature (or feature value) should be measured, analyzed, weighted, or used. A behavior vector may be of size "n" that maps the observer real-time data into an n-dimensional space. Each number or symbol in the behavior vector (i.e., each of the "n" values stored by the vector) may represent the value of a feature of the access point behavior.

The observer module may analyze the behavior vector by applying the behavior vector to an access point classifier model. A classifier model may be a behavior model that includes data, entries, decision nodes, decision criteria, and/or information structures that may be used by a device processor to quickly and efficiently test or evaluate behavior features in real-time data.

Various aspects may be implemented within a variety of communication systems 100, such as at least two mobile telephony networks, an example of which is illustrated in FIG. 1. A first mobile network 102 and a second mobile network 104 typically each include a plurality of cellular base stations (e.g., a first base station 130 and a second base station 140). A first mobile communication device 110 may be in communication with the first mobile network 102 through a cellular connection 132 to the first base station 130. The first mobile communication device 110 may also be in communication with the second mobile network 104 through a cellular connection 142 to the second base station 140. The first base station 130 may be in communication with the first mobile network 102 over a wired connection 134. The second base station 140 may be in communication with the second mobile network 104 over a wired connection 144.

A second mobile communication device 120 may similarly communicate with the first mobile network 102 through the cellular connection 132 to the first base station 130. The second mobile communication device 120 may also communicate with the second mobile network 104 through the cellular connection 142 to the second base station 140. The cellular connections 132 and 142 may be made through two-way wireless communication links, such as 4G, 3G, CDMA, TDMA, WCDMA, GSM, and other mobile telephony communication technologies.

While the mobile communication devices 110, 120 are shown connected to the first mobile network 102 and, optionally, to the second mobile network 104, in some aspects (not shown), the mobile communication devices 110, 120 may include two or more subscriptions to two or more mobile networks and may connect to those subscriptions in a manner similar to those described above.

In some aspects, the first mobile communication device 110 may optionally establish a wireless connection 152 with a peripheral device 150 used in connection with the first mobile communication device 110. For example, the first mobile communication device 110 may communicate over a Bluetooth® link with a Bluetooth-enabled personal computing device (e.g., a "smart watch"). In some aspects, the first mobile communication device 110 may optionally establish a wireless connection 162 with a wireless access point 160, such as over a Wi-Fi® connection. The wireless access point 160 may be configured to connect to the Internet 164 or another network over a wired connection 166.

While not illustrated, the second mobile communication device 120 may similarly be configured to connect with the peripheral device 150 and/or the wireless access point 160 over wireless links.

Figure 2A:
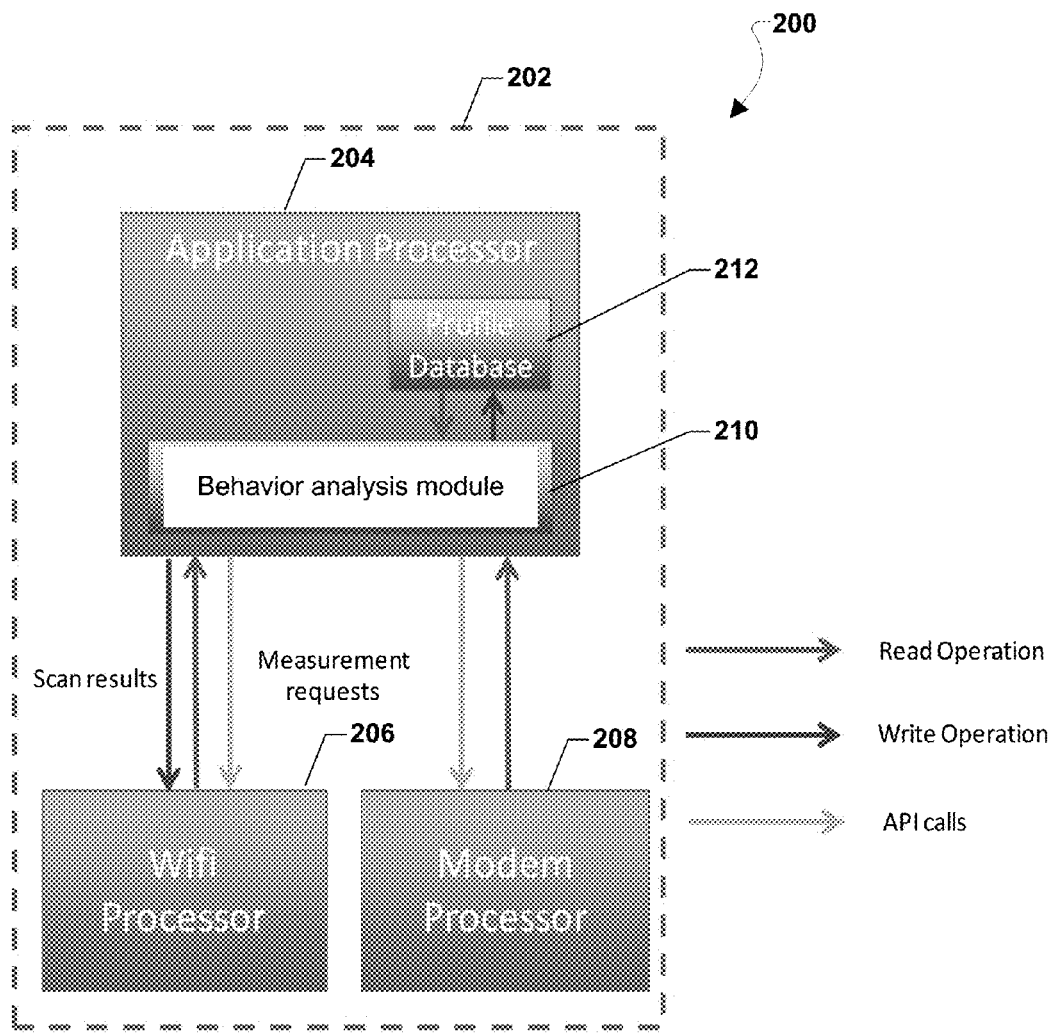
FIG. 2A is a functional block diagram of a mobile communication device implementing a behavior analysis system for analyzing wireless access points according to various aspects.

Various aspects may be implemented using a behavior analysis system 200 executing within a wireless communication device, as illustrated in FIG. 2A. In an aspect, the behavior analysis system 200 may be implemented within a system on chip (SOC) 202 that may include an application processor 204, a Wi-Fi processor 206, and a modem processor 208. The application processor 204 (or any of the other processors within the wireless communication device) may implement a behavior analysis module 210, which may be implemented in software executing within the application processor 204, which in hardware within or coupled to the application processor 204, or within a mixture of hardware and software modules. As described, the behavior analysis model may monitor activities of the Wi-Fi processor 206 as it interacts with wireless access point, which may include monitoring read operations, right operations, and application program interface (API) calls. The behavior analysis module 210 may also be configured to interact with a modem processor 208 that it is configured to communicate with a WWAN, including monitoring read operations and API calls.

The behavior analysis module 210 may access a profile database 212 that includes profiles of various individual and types/models of wireless access points, including expected behaviors and activities of such wireless access points. In an aspect, the profile database 212 may include a number of behavior classification modules, which may be specific or tailored to particular Wi-Fi access points (e.g., models of particular makes/models of the access points, models generated by evaluating particular access points over time, etc.).

Figure 2B:
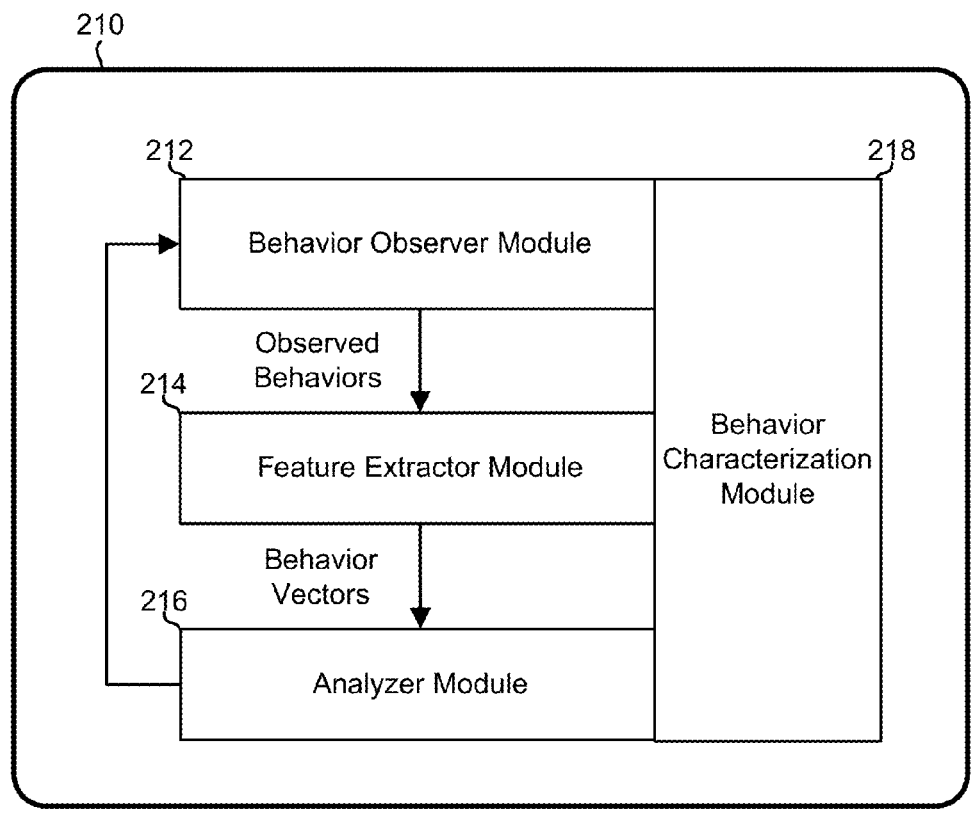
FIG. 2B is a functional block diagram of a behavior analysis system for analyzing wireless access points according to various aspects.

FIG. 2B illustrates example logical components and information flows in an aspect behavior analysis module 210 executing within a processor, such as the application processor 204, the Wi-Fi processor 206, or the modem processor 208, that is configured to use behavioral analysis techniques to characterize behavior of an access point in accordance with the various aspects. The behavior of an access point may be observed and analyzed by a device or modem processor configured with executable instruction modules of a behavior analysis module 210 that includes a behavior observer module 212, a feature extractor module 214, an analyzer module 216, and a behavior characterization module 218.

In various aspects, all or portions of the behavior analysis module 210 may be implemented as part of the behavior observer module 212, the feature extractor module 214, or the analyzer module 216. Each of the modules 212-218 may be a thread, process, daemon, module, sub-system, or component that is implemented in software, hardware, or a combination thereof. In various aspects, the modules 212-218 may be implemented within a modem processor or parts of the operating system (e.g., within the kernel, in the kernel space, in the user space, etc.), within separate programs or applications, in specialized hardware buffers or processors, or any combination thereof within a modem SoC. In an aspect, one or more of the modules 212-218 may be implemented as software instructions executing on one or more processors of a modem (e.g., on a WiFi processor 206).

The behavior characterization module 218 may be configured to characterize the behavior of an access point, generate at least one behavior model based on the observed module's behavior, compare the observed behavior with a behavior model, aggregate the comparisons made by other observer modules of the behavior of the observed module and respective behavior models, and to determine, based on the aggregated comparisons, whether the observed module is behaving anomalously. The behavior characterization module 218 may use the information collected by the behavior observer module 212 to determine behaviors of the observed access point, and to use any or all such information to characterize the behavior of the observed access point.

The behavior observer module 212 may be configured to observe behaviors of the observed access point based on messages, memory accesses, data transformations, activities, conditions, operations, events, and other access point behavior observed over a communication link to the access point.

The behavior observer module 212 may communicate (e.g., via a memory write operation, function call, etc.) the collected observed behavior data to the feature extractor module 214. The feature extractor module 214 may be configured to receive or retrieve the observed behavior data from a log file and use this information to generate one or more behavior vectors. Each behavior vector may succinctly describe the observed behavior data in a value or vector data-structure. In some aspects, the vector data-structure may include a series of numbers, each of which signifies a partial or complete representation of the real-time data collected by the behavior observer module 212.

In some aspects, the feature extractor module 214 may be configured to generate the behavior vectors from a log file generated by the behavior observer module 212. The behavior vectors may function as an identifier that enables the behavioral analysis system (e.g., the analyzer module 216) to quickly recognize, identify, or analyze real-time access point activity and behavior data. In an aspect, the feature extractor module 214 may be configured to generate behavior vectors of size "n," each of which maps the real-time access point activity and behavior data into an n-dimensional space. In an aspect, the feature extractor module 214 may be configured to generate the behavior vectors to include information that may be input to a feature/decision node in the behavior characterization module 218 to generate an answer to a query regarding one or more features of the access point activity and behavior data to characterize the behavior of the access point.

The feature extractor module 214 may communicate (e.g., via a memory write operation, function call, etc.) the generated behavior vector(s) to the analyzer module 216. The analyzer module 216 may be configured to apply the behavior vector(s) to a classifier model to characterize the observed behaviors of the access point, such as whether the observed behaviors indicate that the access point is legitimate, non-legitimate, or anomalous.

A classifier model may be a behavior model that includes data and/or information structures (e.g., feature vectors, behavior vectors, component lists, etc.) that may be used to evaluate a specific feature or aspect of access point activities. The classifier model may also include decision criteria for monitoring a number of access point activities messages, states, conditions, behaviors, processes, operations, etc. (herein collectively "features"). The classifier model may be preinstalled on the computing device, downloaded or received from a network server, generated in the observer module, or any combination thereof. The classifier model may be generated by using behavior modeling techniques, machine learning algorithms, or other methods of generating classifier models.

In some aspects, classifier model specific to certain models or locations of access points may be used, which is a classifier model that includes a focused data model that includes/tests only access point-specific features/entries that are determined to be most relevant to evaluating the behavior of a particular access point.

In an aspect, the analyzer module 216 may be configured to adjust the granularity or level of detail of the features of the access point that the analyzer module evaluates, in particular when an analysis features of access point behavior is inconclusive. For example, the analyzer module 216 may be configured to notify the behavior observer module 212 in response to determining that it cannot characterize a behavior of an access point. In response, the behavior observer module 212 may change the factors or behaviors that are monitored and/or adjust the granularity of its observations (i.e., the level of detail and/or the frequency at which observed behavior is observed) based on a notification sent from the analyzer module 216 (e.g., a notification based on results of the analysis of the observed behavior features).

The behavior observer module 212 may also observe new or additional behaviors, and send the new/additional observed behavior data to the feature extractor module 214 and the analyzer module 216 for further analysis/classification. Such feedback communications between the behavior observer module 212 and the analyzer module 216 may enable the behavior analysis module 210 to recursively increase the granularity of the observations (i.e., make more detailed and/or more frequent observations) or change the real-time data that are observed until the analyzer module can evaluate and characterize behavior of an access point to within a range of reliability or up to a threshold level of reliability. Such feedback communications may also enable the behavior analysis module 210 to adjust or modify the behavior vectors and classifier models without consuming an excessive amount of processing, memory, or energy resources.

In various aspects, the classifier model may be a set of boosted decision stumps based on specific features of access point behavior. Boosted decision stumps are one-level decision trees that may have exactly one node (i.e., one test question or test condition) and a weight value, and may be suited for use in a light, non-processor intensive binary classification of data/behaviors. Applying a behavior vector to boosted decision stump may result in a binary answer (e.g., 1 or 0, yes or no, etc.). For example, a question/condition tested by a boosted decision stump may include whether a word or sound detected by a device microphone is characteristic of an RF-sensitive environment, or whether an image of another device captured by a device camera is recognizable as an RF emissions generating hazard, the answers to which may be binary. Boosted decision stumps are efficient because they do not require significant processing resources to generate the binary answer. Boosted decision stumps may also be highly parallelizable, and Thus, many stumps may be applied or tested in parallel/at the same time (e.g., by multiple cores or processors in a module, computing device, or system).

Figure 2C:
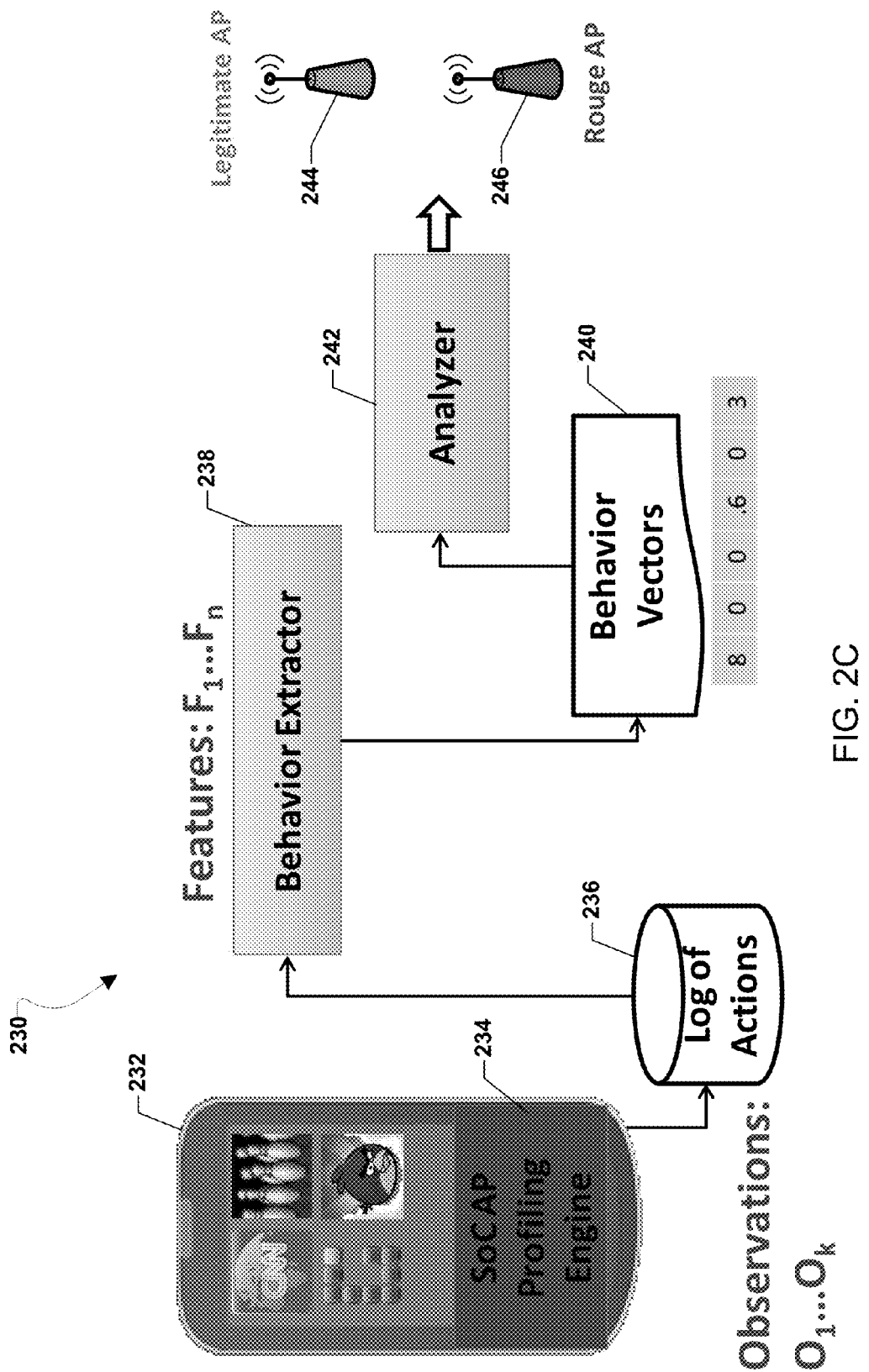
FIG. 2C is another functional block diagram illustrating a sequence of operations for analyzing wireless access points using a behavior analysis system according to various aspects.

FIG. 2C illustrates interactions among the various modules of a behavior analysis system for analyzing access point behavior in order to recognize rogue access points and/or authenticate legitimate access points. In various aspects, a mobile communication device 232 may be configured with a software or hardware module that monitors activities and behaviors of wireless access points, referred to as a SoC AP profiling engine 234 in FIG. 2C. This profiling engine 234 may monitor interactions of a modem with wireless access points 244, 246 in the series of observations ($O_1 \ldots O_k$) that may be stored in a log of actions 236 within memory. Such a log of actions 236 may include identification of an activity or interaction with wireless access points 244, 246, as well as the time of that interaction. Thus, the log of actions 236 may include both the activities and time-based information that can be used to determine frequency, round-trip times, and network responsiveness.

A behavior extractor 238 may access the log of actions 236 and extract from them particular features of activities or behaviors that are to be analyzed for characterizing a wireless access point. The behavior extractor 238 may be a hardware or software module (or combinations of hardware and software) configured to identify particular features within the log of actions and generate a behavior vector 240 in which individual entries characterize identified features. Identified features may be selected in advance based on analysis of particular types of activities or behaviors useful in categorizing a wireless access point as legitimate or anomalous. Features may be individual activities, or calculated values based upon a sequence of activities. Examples of individual activity features include access point name, rate switch mode, maximum protocol data unit (PDU) size, security configurations (e.g., implemented encryption or hash function), firewall or network access configurations, open ports, use of DMZ, default gateway, IP address subnet, network address translation scheme, supported technologies (e.g., 801.11 a/b/g/n/ac), short interframe space, distributed interframe space, maximum retry count, preamble size, max protocol data unit size, multiple protocol data unit support, number of antennas, supported transmission modes, number of messages generated in response to broadcast or unicast requests. Examples of calculated values that may be features tracked by the behavior extractor 238 include frequency of handshaking procedures, up-time of the access point, the round trip time between a request sent from the device and a response from the access point, requests for device credentials, path information to a specific server (e.g., hop count, route delay), network delay, a number of network accesses within a defined period of time (e.g., 10 seconds), location and mobility information, sudden changes in modulation and coding scheme, sudden changes in access point transmit power that can be determined by the behavior extractor 238 accessing a number of long actions and calculating a frequency, duration, and/or a success value.

The behavior extractor 238 may transform each observed or extracted behavior feature into a numerical value, which when assembled with all feature values forms a behavior vector 240. As illustrated in FIG. 2C, a behavior vector may be a series of numbers, in which the position of a number in the vector corresponds to a particular feature and the value characterizes that feature.

The generated behavior vectors 240 may be applied to an access point classifier model in an analyzer 242 in order to classify the wireless access points 244, 246. The classifier model may use a behavior vector as an input to a series of weighted determinations (e.g., boosted decision stumps) that when totaled together yield a single value or simple conclusion. For example, the result of applying a behavior vector to a classifier model based on boosted decision stumps may be a single value that represents a probability that the wireless access point is rogue. An output of the analyzer 242 may be this value, which may be compared to a threshold by a processor of the mobile communication device to determine whether the access points 244, 246 are legitimate or rogue.

Figure 3:
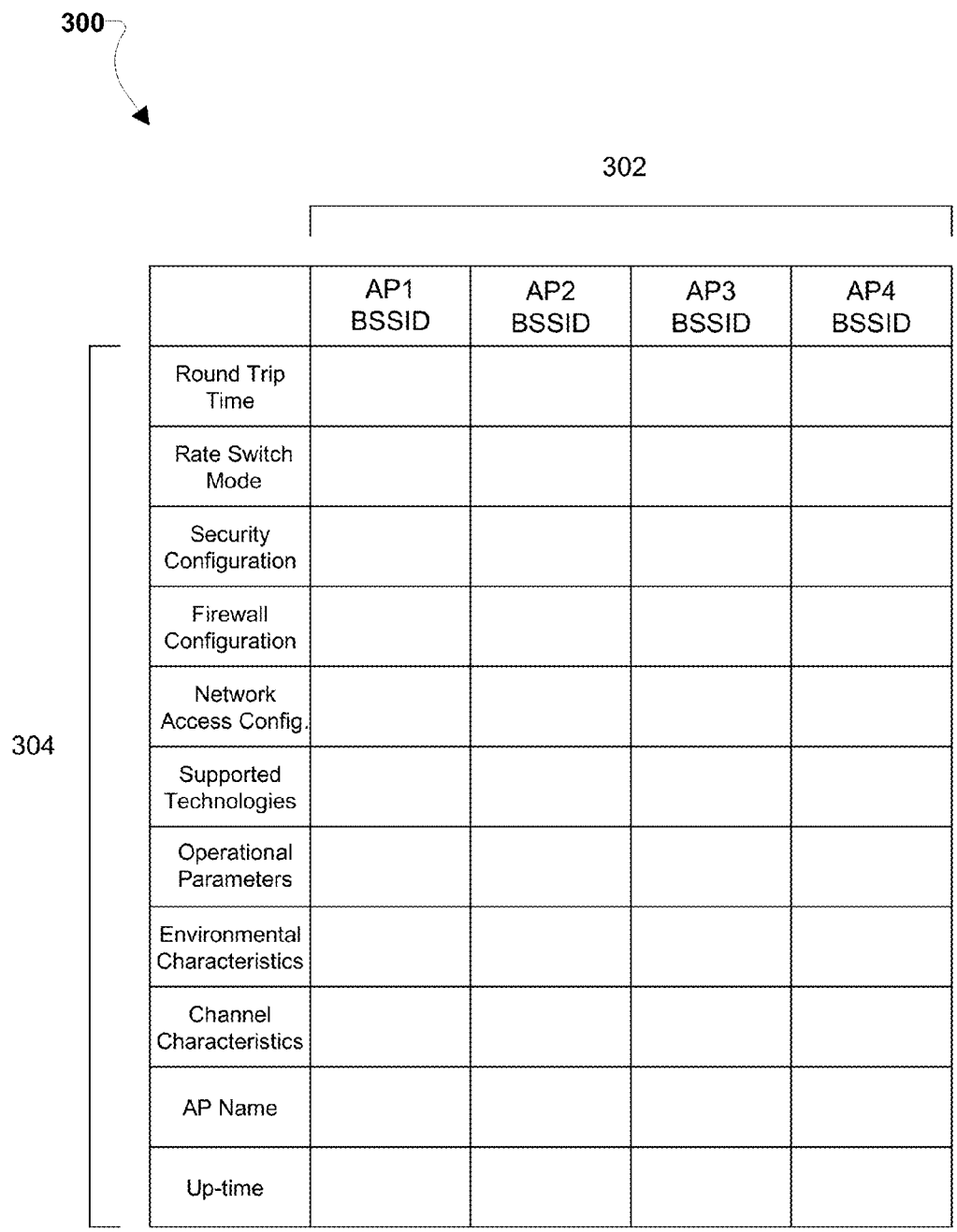
FIG. 3 is an example of a network access point profile database stored according to various aspects.

FIG. 3 illustrates an example of a profile database 300 storing profiles for trusted or trustworthy network access points. The profile database 300 may be stored in memory on a mobile communication device 110. Alternatively, the profile database 300 may be stored on a remote server that is accessible by the mobile communication device. The profile database 300 may include profiles 302 for a number of trusted network access points. The profiles 302 may apply to individual devices serving as an access point, or may apply to a class of access point devices that behave in a similar manner (e.g., access point devices from the same vendor or manufacturer). The trusted network access points may be access points to which the mobile communication device has previously connected and determined to be trustworthy. In some aspects, the profile database 300 or another profile database stored in the mobile communication device may store profiles for known rogue access points (i.e., a blacklist). When the mobile communication device encounters an access point that matches a profile on the blacklist, the mobile communication device may automatically block communication with such an access point.

Each profile in the profile database 300 may be indexed by a profile's basic service set identifier (BSSID). For example, the BSSID may be a medium access control (MAC) address for a particular network access point, or a range of MAC addresses for a class (e.g., make/model) of network access points from the same vendor. Each profile 302 may contain a number of expected parameters 304. Expected parameters 304 represent the expected characteristics or behaviors of a known network access point. When taken together, expected parameters 304 may uniquely identify a network access point (or class of access points) and may be used to differentiate different network access points (or different classes of access points). The expected parameters 304 for a network access point may be obtained through previous interactions between the mobile communication device and the network access points, or may be obtained from a remote server that has compiled expected parameters from numerous devices.

The expected parameters 304 for a network access point may include, but are not limited to, an access point name, up-time of the access point, the round trip time between a request sent from the device and a response from the access point, a rate switch mode, security configurations (e.g., implemented encryption or hash function), firewall or network access configurations (e.g., open ports, use of DMZ, default gateway, IP address subnet, network address translation scheme, path information to a specific server (hope count, delay route)), supported technologies (e.g., 801.11 a/b/g/n/ac), operational parameters (e.g., short interframe space, distributed interframe space, maximum retry count, preamble size, max protocol data unit size, multiple protocol data unit support, $W_{min}$, $W_{max}$), response delay characteristics, processing time characteristics, and channel or environmental characteristics (e.g., basic service set load, channel load, error rate, throughput, identity of neighbor access points or WWANs, location information). Additional parameters may be added to the expected parameters 304 over time. The expected parameters 304 may include identifiers, numerical values, numerical ranges, specific addresses or range of addresses, and text. A mobile communication device may query the network access point to obtain some of the expected parameters 304, may receive some of the expected parameters 304 passively from the network access point, and may use information received from the network access point to calculate other expected parameters.

In an aspect, the profile database 300 may be configured as a classifier model in which each expected parameter 304 corresponds to a test (such as a boosted decision stub) or threshold for each feature value in an access point behavior vector, as may be generated by a feature extractor 216 as described with reference to FIGS. 2A and 2B. Thus, the comparison of access point behaviors to expected parameters 304 may be accomplished by applying an access point behavior vector to an access point behavior classifier model based on the expected parameters for the network access point.

Figure 4A:
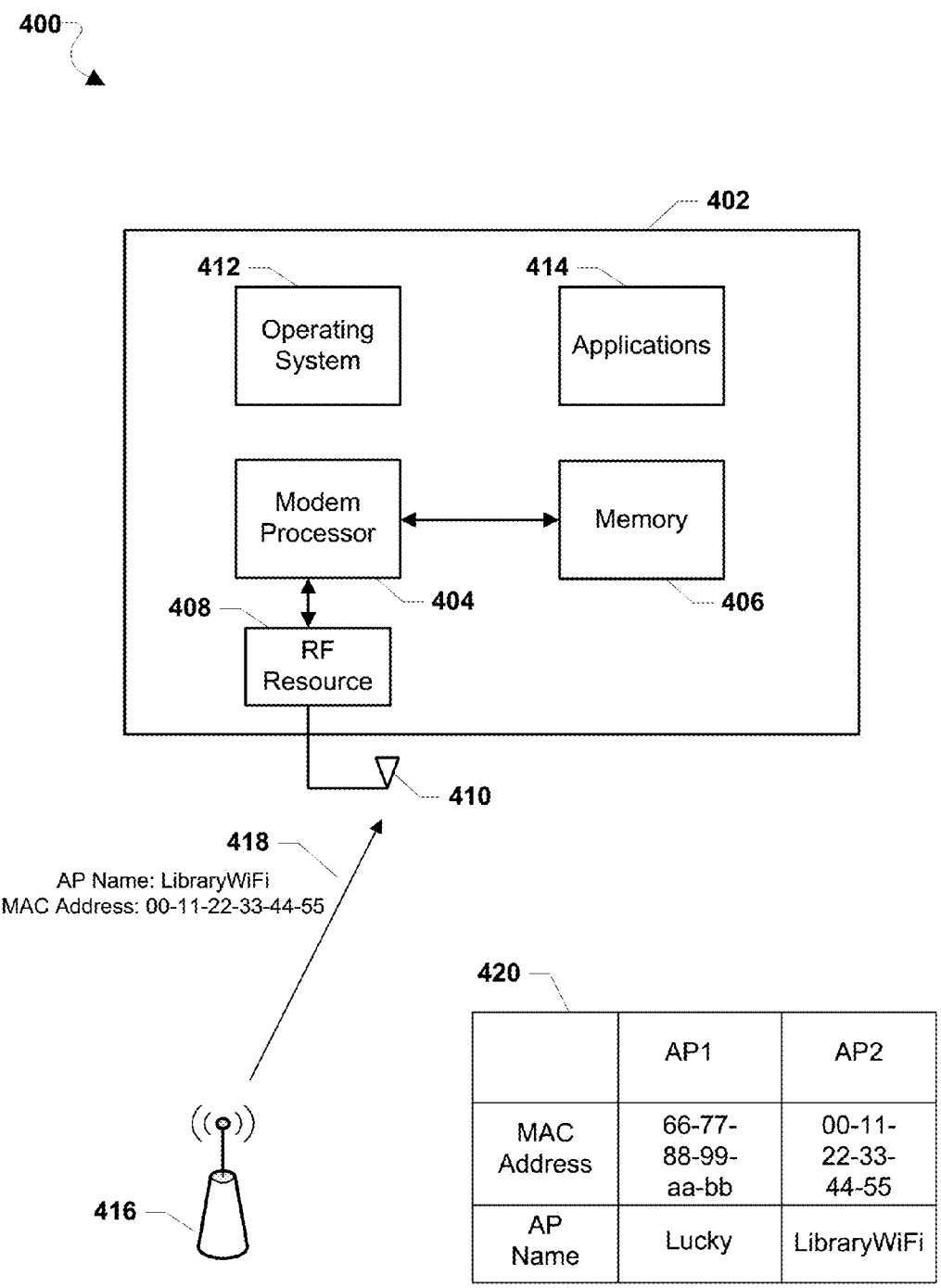
FIGS. 4A-4C are diagrams illustrating the profiling of a potential network access point according to various aspects.
Figure 4B:
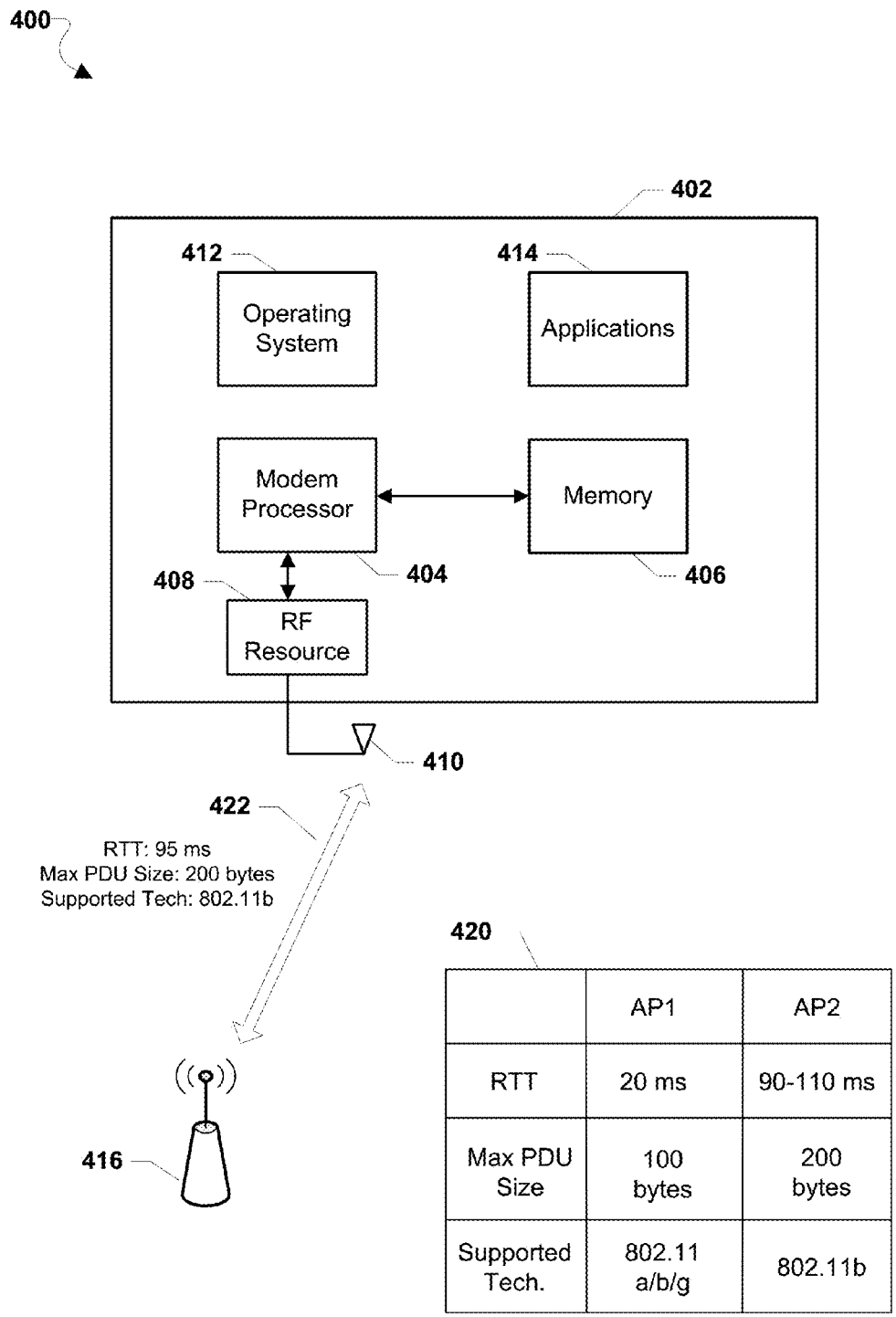
Figure 4C:
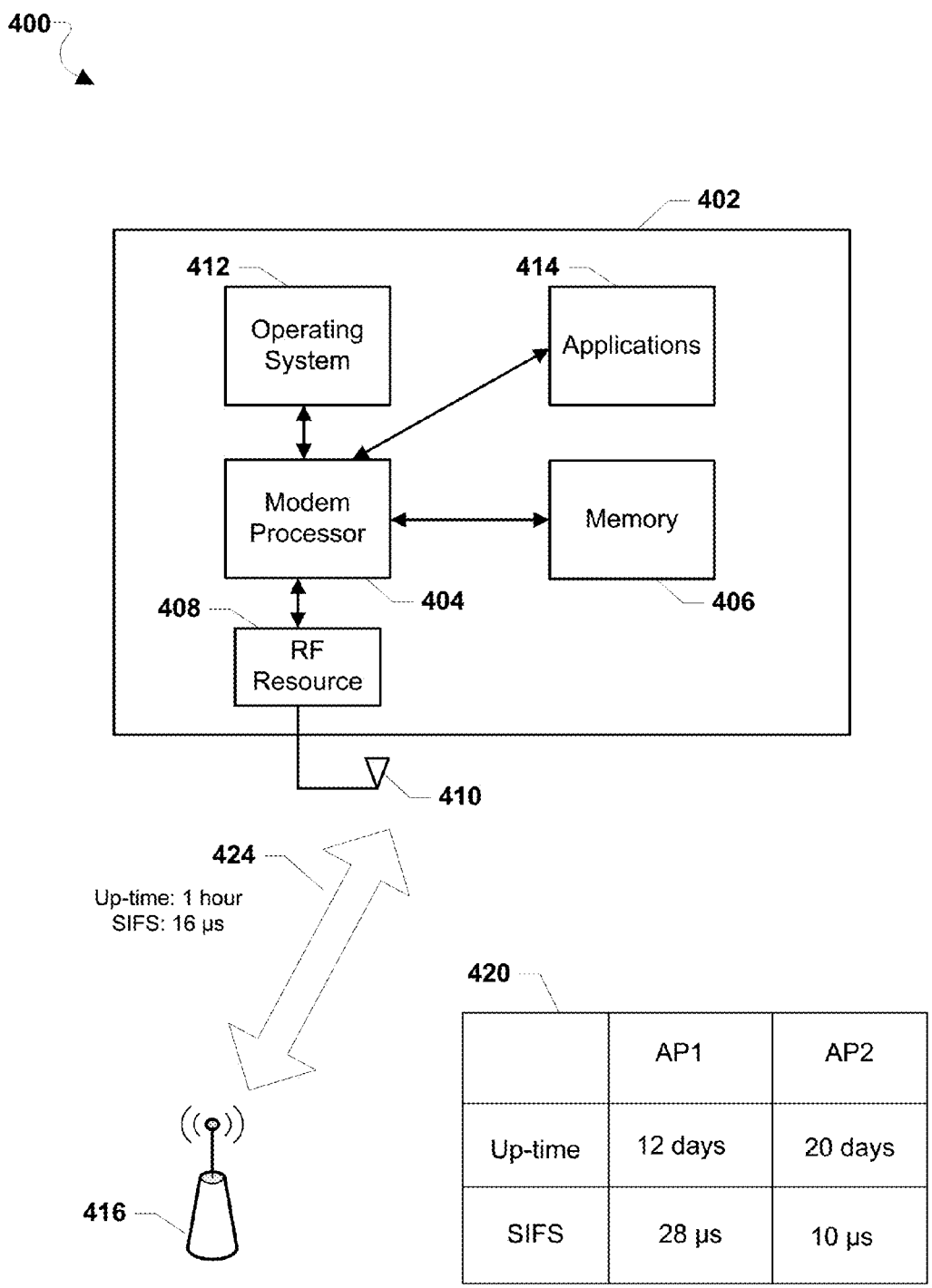

FIGS. 4A-4C illustrate a process for profiling a potential network access point by a mobile communication device storing a profile database or access point classifier model. FIG. 4A illustrates a system 400 including a mobile communication device 402 and a network access point 416. The mobile communication device 402 may include a modem processor 404 connected to memory 406. The mobile communication device 402 may also include other modem processors not illustrated in FIG. 4A. The memory 406 may store a profile database 420. Alternatively, the profile database 420 may be stored on a remote server and accessible to the mobile communication device 402 (not illustrated). The modem processor 404 is also connected to an RF resource 408 and an antenna 410. The modem processor 404 may also be connected to other RF resources and antennas not illustrated in FIG. 4A. The modem processor 404, along with the RF resource 408 and antenna 410 (and optionally additional modem processors, RF resources, and antennas) form two or more radio access technologies (RATs). For example, a first RAT may be configured to communicate with a WWAN, such as a cellular telephone network, and a second RAT may be configured to communicate with a WLAN, such as a WiFi® hotspot.

The mobile communication device 402 also may include a high level operating system 412 and applications 414 that execute on the mobile communication device 402. The operating system 412 and the applications 414 may communicate with the modem processor 404 in order to communicate over the RATs supported the modem processor 404.

The network access point 416 may be a WiFi® hotspot or other device that broadcasts itself as a network access point. The modem processor 404 may passively receive a broadcast 418 from the network access point 416 via the second RAT, i.e. the WLAN network. The broadcast 418 contains certain observed parameters that describe the characteristics or behavior of the network access point 416. For example, the broadcast 418 may include the name of the access point ("LibraryWiFi"), and the medium access control (MAC) address of the access point (00-11-22-33-44-55).

The modem processor 404 may compare the observed parameters included in the broadcast 418 with the profile database 420 to determine whether a profile in the profile database 420 has expected parameters that match the observed parameters of the network access point 416. The profile database 420 may be indexed by the MAC address or other BSSID of a network access point. The modem processor 404 may match the MAC address in the broadcast 418 with a profile having the same MAC address in the profile database 420. If the exact MAC address is not found, the modem processor 404 may match the MAC address in the broadcast 418 with a range of MAC addresses for a profile associated with a class of access points (e.g., access point devices from the same vendor or manufacturer). The modem processor may then compare the other observed parameters in the broadcast 418 with the corresponding expected parameters in the profile database 420.

Matching observed parameters to expected parameters may include comparing numerical values to determine whether they match, comparing numerical values to numerical ranges to determine whether the value falls within the range, comparing configuration parameters, comparing text strings, or other types of data comparison. In some aspects, matching observed parameters to expected parameters may involve applying a behavior vector characterizing the observed parameters to a classifier model that is based upon the expected parameters. Matching observed parameters to expected parameters for a network access point may include more complex analysis, such as mapping the observed and expected parameters to eigenvectors, and then using matrix multiplication to derive an eigenvalue representative of a level of trust or risk associated with the network access point 416. If the observed parameters do not match expected parameters of any profile in the profile database 420, the modem processor 404 may take steps to restrict access to the network access point 416, such as blacklisting the network access point 416, removing the potential network access point 416 from the list of available network connections to be sent to the operating system 412 and displayed to the user, or blocking all communication to and from the network access point 416.

The modem processor 404 may receive the observed parameters and perform the comparison without communication with the operating system 412 or any applications 414. That is, the modem processor 404 may isolate the network access point 416 from other, higher level components in the mobile communication device 402 until the modem processor 404 has verified the trustworthiness of the network access point 416. In this manner, modem processor 404 may implement a progressive or tiered approach to profiling network access points. In addition, utilizing only the modem processor 404 and the second RAT to profile the network AP 416 may result in less consumed power than other methods that may utilize higher level components in the mobile communication device 402.

As illustrated in FIG. 4A, the profile "AP2" in the profile database 420 has a MAC address that matches the MAC address in the broadcast 418. The modem processor 404 may then compare the access point name in the broadcast 418 with the access point name of the AP2 profile in the profile database 420. Both access point names are the same, and so the modem processor 404 may determine that the network access point 416 matches a profile in the profile database 420 with respect to the observed parameters. The profile database 420 may contain additional parameters that are not found in the broadcast 418, but these additional parameters are not compared at this time. Thus, the modem processor 404 may allow communication with the network access point 416 on a higher but still limited level of communication.

FIG. 4B illustrates the mobile communication device 402 and the network access point 416 engaged in a higher level of communication than the broadcast 418 illustrated in FIG. 4A. The modem processor 404 may engage in limited packet data communication 422 with the network access point 416 in response to determining that the observed parameters received in the broadcast 418 match a profile in the profile database 420. The modem processor 404 may use the second RAT (e.g., a WLAN connection) to communicate with the network access point 416. The communication 422 may include requests by the modem processor 404 for certain parameters of the network access point 416. The communication 422 may also include responses to those queries by the network access point 416 to send additional observed parameters, which may or may not include parameters previously sent in the broadcast 418. In this manner, modem processor 404 may implement a tiered or hierarchal approach to profiling network access points utilizing different levels of communications.

The observed parameters shown in FIG. 4B include the round trip time (RTT), maximum protocol data unit (PDU) size, and supported technologies of the network access point 416. The modem processor 404 may receive the new observed parameters and compare them to expected parameters of the corresponding profile AP2 in the profile database 420. As with the broadcast 418, the modem processor 404 may perform the analysis of the observed parameters without utilizing higher level components in the mobile communication device 402. If the observed parameters do not match expected parameters of the AP2 profile, the modem processor 404 may take steps to restrict access to the network access point 416.

As illustrated in FIG. 4B, the observed parameters in the communication 422 match or fall within expected parameters for the RTT, max PDU size, and supported technologies of the AP2 profile in the profile database 420. Thus, the modem processor 404 may determine that the network access point 416 continues to match the AP2 profile in the profile database 420 with respect to the new observed parameters. In response, the modem processor 404 may allow communications with the network access point 416 on a higher level of communication. The modem processor 404 may add the network access point 416 to a whitelist of trusted access points. If the specific MAC address of the network access point 416 was not previously found in the profile database 420 (e.g., the network access point 416 was matched to a profile associated with a class of access points), the modem processor 404 may update the profile database 420 by adding a profile specifically for the network access point 416.

FIG. 4C illustrates the mobile communication device 402 and the network access point 416 engaged in a higher level of communication than the communication 422 illustrated in FIG. 4B. The modem processor 404 may engage full data communication 424 with the network access point 416 in response to determining that the observed parameters received in the communication 422 match the AP2 profile in the profile database 420. The full data communication 424 may be conducted using the second RAT on the mobile communication device 402, i.e. a regular WiFi® connection. The full data communication 424 may also involve the high level operating system 412 and the applications 414 executing on the mobile communication device 402.

The modem processor 404 may continue to engage in additional monitoring and profiling of the network access point 416 after a full wireless connection has been established. This continuous profiling allows the modem processor 404 to detect changes in behavior that may indicate malicious behavior that may only occur after the connection has been established for a period of time. This continuous monitoring may defeat a rogue wireless access point that functions as a legitimate access point for a period of time before beginning malicious behavior. The profiling may be conducted on a periodic basis, or may be triggered by certain events (e.g., traffic redirect). The profiling may be passive (i.e., obtaining observed parameters independently sent by the network access point 416) or active (i.e., requesting information from the network access point 416 or triggering an action and monitoring the reaction of the network access point 416). The modem processor 404 may obtain additional observed parameters from the network access point 416, which may vary depending on the operating state of the mobile communication device 402. For example, a round trip time parameter may be relevant when the distance between the network access point 416 and the mobile communication device 402 does not usually change, but may be less relevant if the distance usually changes. Observed parameters that suddenly change may indicate a change in behavior of the network access point 416, which may lead to additional profiling.

As illustrated in FIG. 4C, a communication 424 may contain additional observed parameters for the network access point 416, including the up-time and the short inter frame space (SIFS) value. The modem processor 404 may receive the observed parameters and compare them to the corresponding expected parameters of the AP2 profile in the profile database 420. In the example illustrated in FIG. 4C, the observed parameter of the up-time in the communication 424 does not match the expected up-time of the AP2 profile in the profile database 420. In response, the modem processor 404 may optionally attempt to re-observe the up-time or other parameters from the network access point 416 to double-check whether there is a match. Upon determining that there is no longer a match between the observed and expected parameters, the modem processor 404 may take steps to restrict further access to the network access point 416, such as blocking all communications to and from the network access point 416, or adding the network access point 416 to a blacklist.

Figure 5:
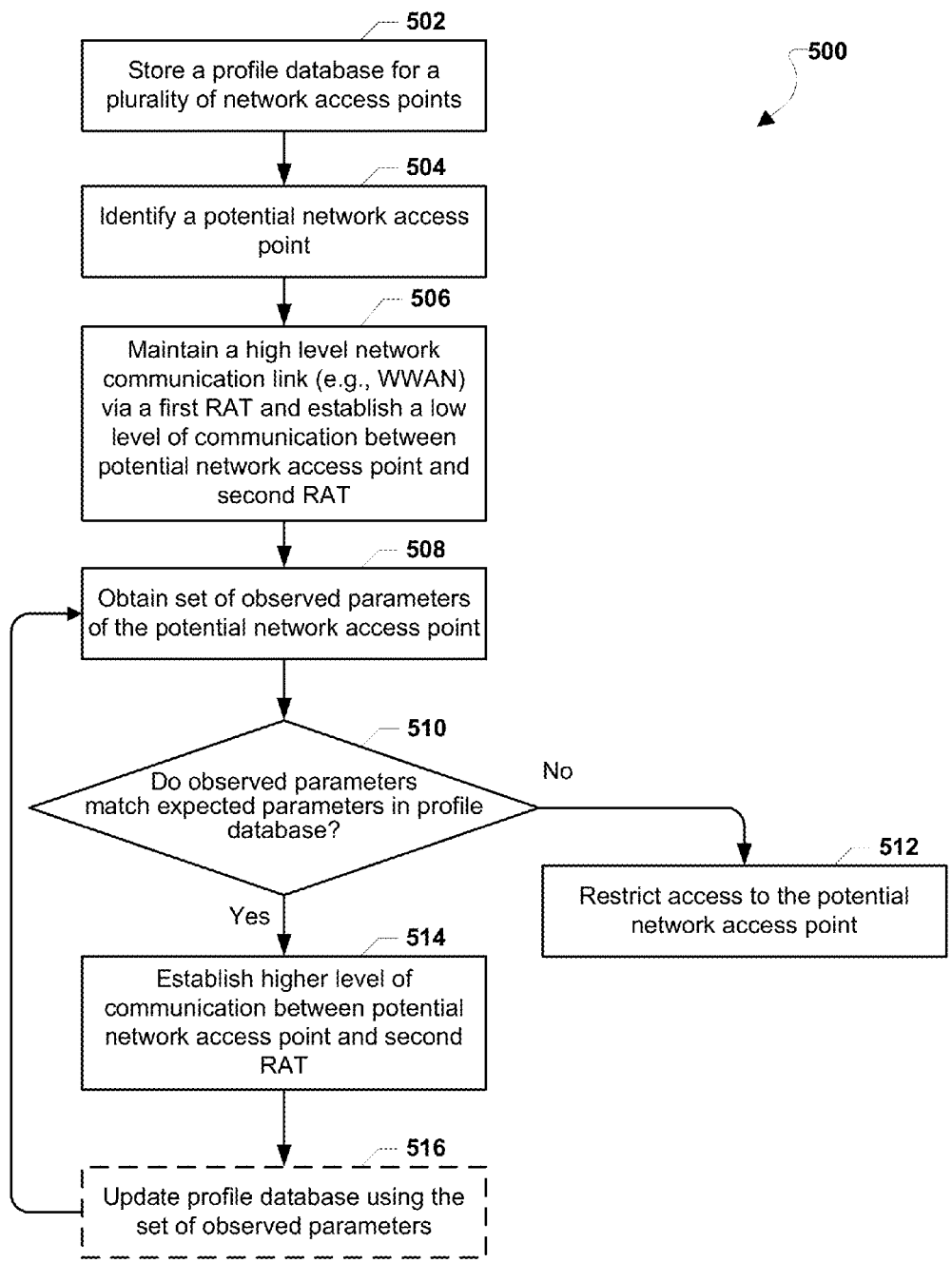
FIG. 5 is a process flow diagram illustrating a method for profiling access points for a mobile communication device according to various aspects.

FIG. 5 illustrates a method 500 for profiling network access points on a mobile communication device according to various aspects. The method 500 may be implemented with a modem processor (e.g., a WiFi processor 206 or modem processor 208, a separate controller, and/or the like) of a mobile communication device (such as the mobile communication devices 110, 200) that controls two or more radio access technologies (RATs).

In block 502, a profile database for a number of trusted network access points may be stored. The profile database may be stored in memory on the mobile communication device, or alternatively on a remote server that is accessible to the mobile communication device via a WWAN. The profile database may store profiles for a plurality of network access points, in which each profile may include expected parameters of a particular network access point or a particular class of network access points (e.g., network access point devices from the same vendor or manufacturer). The profile database may store profiles for trusted network access points, for example for access points that the mobile communication device has previously used. If the profile database is stored on a remote server, the server may aggregate expected parameters collected by a number of devices. The profile database may be indexed by a BSSID associated with each network access point, such as a MAC address or range or MAC addresses for a class of network access points. In some aspects, the profile database may also store profiles for known rogue access points (i.e., a blacklist).

The expected parameters may be the expected characteristics or behavior of a network access point, or decision criteria based upon the expected characteristics or behaviors. An example of a profile database is described above with reference to FIG. 3. The expected parameters may include, but are not limited to, an access point name, up-time of the access point, the round trip time between a request sent from the device and a response from the access point, a rate switch mode, security configurations (e.g., implemented encryption or hash function), firewall or network access configurations (e.g., open ports, use of DMZ, default gateway, IP address subnet, network address translation scheme, path information to a specific server (hope count, delay route)), supported technologies (e.g., 801.11 a/b/g/n/ac), operational parameters (e.g., short interframe space, distributed interframe space, maximum retry count, preamble size, max protocol data unit size, multiple protocol data unit support, $W_{min}$, $W_{max}$), response delay characteristics, processing time characteristics, and channel or environmental characteristics (e.g., basic service set load, channel load, error rate, throughput, identity of neighbor access points or WWANs, location information).

In block 504, the modem processor may identify a potential network access point. For example, the mobile communication device may be in range of several potential network access points, with each access point broadcasting availability as a network connection to the Internet. In block 506, the modem processor may maintain a high level network communication link with a network (WWAN) using a first RAT of the mobile communication device, while establishing a first, low level of communication between the potential network access point and a second RAT (e.g., WiFi) of the mobile communication device. The first RAT may be configured to communicate with a WWAN, for example a cellular telephone network such as LTE, CDMA, or GSM. In this manner, the mobile communication device can continue to have full Internet communications while evaluating a wireless access point. Such trusted communications with a WWAN may enable the communication device to receive profile data and other information that may be useful in evaluating the wireless access point.

The first, low level of communication first established between the second RAT and the wireless access point may include passive communications in which the second RAT passively receives information from the potential network access point. The first, low level of communications may also include small levels of two-way communications in which the modem processor may request certain information from the potential network access point. The modem processor may prevent the potential network access point from communicating with higher level components in the mobile communication device, such as the high level operating system and applications executing on the mobile communication device. This may prevent the potential network access point from accessing higher level components before the trustworthiness of the potential network access point is verified. Allowing only the modem processor and second RAT to interact with the potential network access point may also reduce battery consumption in the mobile communication device.

In block 508, the modem processor may obtain a set of observed parameters from the potential network access point through the first, low level of communications. The observed parameters may include one or more parameters that represent the observed characteristics or behavior of the network access point. The observed parameters may correspond to one or more of expected parameters in the profile database.

In determination block 510, the modem processor may determine whether the set of observed parameters from the potential network access point matches the corresponding expected parameters of a profile in the profile database corresponding to the potential network access point. In other words, the modem processor may determine whether the potential network access point has a corresponding profile in the profile database, and whether the observed parameters acquired from the potential network access point match expected parameters of the profile. In an aspect, the operations in determination block 510 may involve applying a behavior vector characterizing the observed network parameters to a classifier model as described above. Another aspect process of matching observed parameters to expected parameters is described further with reference to FIG. 6.

In response to determining that the set of observed parameters from the potential network access point does not match expected parameters of any profile in the profile database (i.e., determination block 510="No"), the modem processor may restrict access to the potential network access point in block 512. In other words, in response to determining that the potential network access point is not found within the profile database of trusted access points, the modem processor may prevent the mobile communication device from connecting with the potential network access point. The modem processor may restrict access to the potential network access point in a number of ways, for example, by blacklisting the potential network access point, by blocking all communication with the potential network access point, by severing the association between the mobile communication device and the potential network access point, or by removing the potential network access point from the list of available network connections to be sent to the operating system and displayed to the user.

In response to determining that the set of observed parameters from the potential network access point does match expected parameters of a profile in the profile database (i.e., determination block 510="Yes"), the modem processor may establish a second, higher level of communications between the potential network access point and the second RAT on the mobile communication device. In other words, upon verifying a certain level of trustworthiness of the potential network access point based on the received set of observed parameters, the modem processor may allow an increased level of communications with the potential network access point. The second level of communications may include two-way communications with the potential network access point with a higher data exchange rate. The second level of communications may include communications between the potential network access point and higher level components in the mobile communication device, such as the high level operating system and applications executing on the mobile communication device.

In optional block 516, the modem processor may update the profile associated with the potential network access point in the profile database with the set of observed parameters. The update may include updating the average or range of numerical parameters, or certain other behaviors or characteristics of the potential network access point. This update ensures that the profile database stores the most recent information regarding the characteristics and behavior of trusted network access points. If the profile database is stored on a remote server, the modem processor may send the observed parameters to the server so that the server may update the profile database.

The modem processor may obtain another set of observed parameters from the potential network access point through the second level of communication in block 508. The modem processor may again determine whether the new set of observed parameters matches expected parameters for the potential network access point stored in the profile database. If the observed parameters continue to match expected parameters, the modem processor may maintain the second level of communication or may move to a third, higher level of communication. If the observed parameters do not match expected parameters, the modem processor may return to low-level communications with the potential network access point in order to further assess its behaviors, or restrict further access to the access point.

The various aspects enable the modem processor to implement a tiered approach to profiling a potential network access point such that upon verifying that a potential network access point matches a profile with respect to the obtained observed parameters the modem processor may allow increased communications between the mobile communication device and the potential network access point. The modem processor may obtain additional observed parameters from the potential network access point on a periodic basis, or on an event-basis. The modem processor may obtain additional observed parameters passively or actively from the potential network access point. In this manner, the method 500 provides a way for a mobile communication device to implemented tiered profiling of potential network access points while minimizing the battery power consumed by such profiling.

Figure 6:
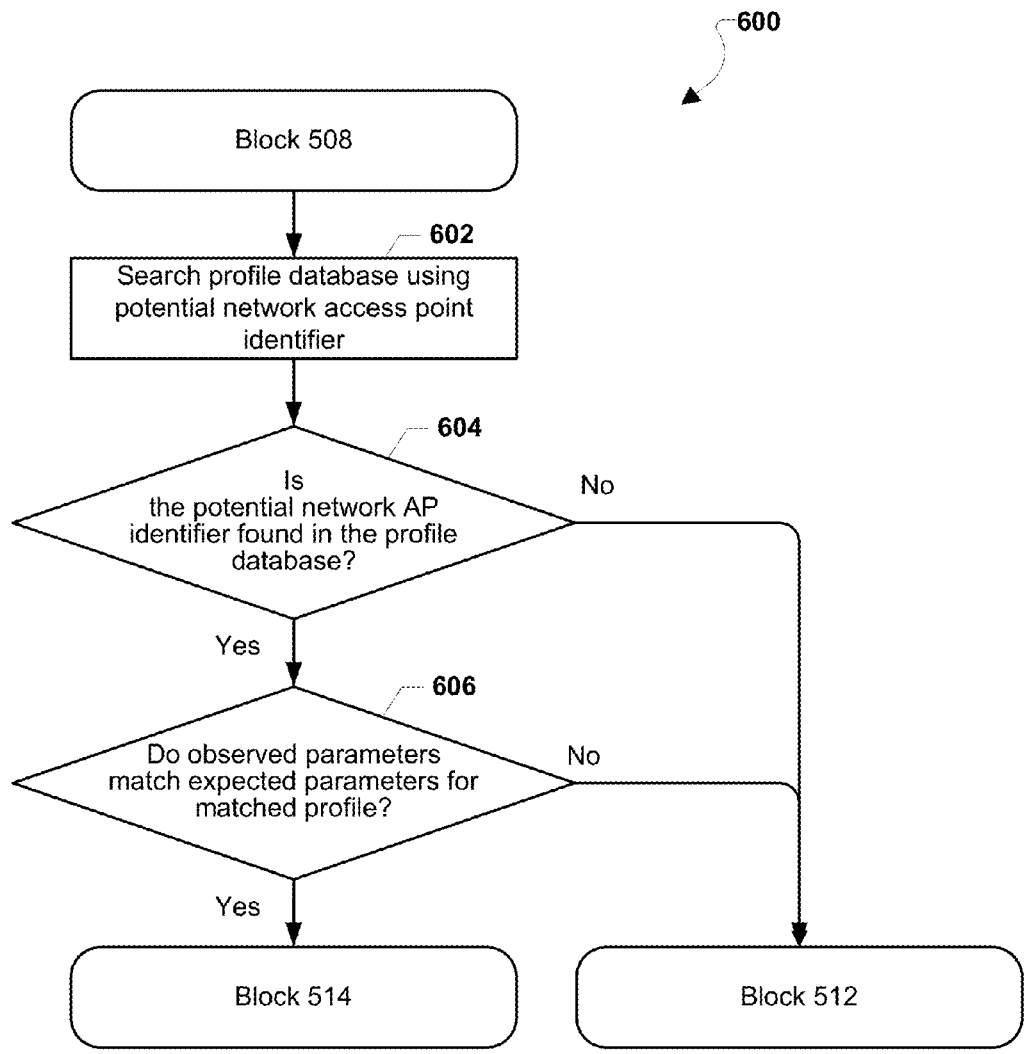
FIG. 6 is a process flow diagram illustrating a method for comparing observed parameters of a potential network access point to a profile database according to various aspects.

FIG. 6 illustrates a method 600 for determining whether a set of observed parameters of a potential network access point match expected parameters stored in a profile database according to various aspects. With reference to FIGS. 1-6, the method 600 may be implemented with a modem processor (e.g., a Wi-Fi processor 206, a modem processor 208, a separate controller, and/or the like) of a mobile communication device (such as the mobile communication device 110) that controls two or more RATs. The method 600 may implement the operations illustrated in determination block 510 of the method 500 (FIG. 5) after the modem processor has obtained a set of observed parameters from a potential network access point.

In block 602, the modem processor may search the profile database using an identifier of the potential network access point. The identifier may be a BSSID of the potential network access point, such as a MAC address. The profiles in the profile database may be indexed by BSSIDs, such as BSSIDs for individual access points and ranges of BSSIDs for classes of access points that should behave in the same way (e.g., access point devices from the same vendor).

In determination block 604, the modem processor may determine whether the identifier of the potential network access point matches an identifier of a profile in the profile database. A match may occur if the BSSID of the potential network access point matches a BSSID or falls within a range of BSSIDs of a profile in the profile database. In response to determining that the identifier of the potential network access point does not match the identifier of any profile in the profile database (i.e., determination block 604="No"), the modem processor may restrict access to the potential network access point in block 512 of FIG. 5.

In response to determining that the identifier of the potential network access point does match an identifier of a profile in the profile database (i.e., determination block 604="Yes"), the modem processor may then determine whether the set of observed parameters obtained from a potential network access point matches expected parameters of the corresponding profile in the profile database. The comparison of observed parameters and expected parameters may include comparing a value of each observed parameter with the expected value or range of expected values for the selected profile. The comparison may also include generating a risk or trust indicator based on the degree to which the observed parameters match expected parameters, for example by converting the observed and expected parameters into eigenvector form and using matrix multiplication to derive an eigenvalue representing a risk or trust value. The risk or trust value may be compared to a threshold, which determines whether the potential network access point is sufficiently trustworthy. In an aspect, the operations of determination block 604 may be accomplished by applying a behavior classifier model to a behavior vector characterizing the observed parameters from the potential network access point to classify the access point as legitimate, suspect, or rogue.

In response to determining that the set of observed parameters matches the corresponding expected parameters of the matched profile (i.e., determination block 606="Yes"), or in response to classifying the access point as legitimate, the modem processor may establish a higher level of communication between the mobile communication device and the potential network access point in block 514 of FIG. 5. If the potential network access point was only matched to a profile associated with a class of access points, the modem processor may optionally update the profile database by creating a new profile for the specific potential network access point.

In response to determining that the set of observed parameters does not match the corresponding expected parameters of the matched profile (i.e., determination block 606="No"), or in response to classifying the access point as suspect or rogue, the modem processor may restrict access to the potential network access point in block 512 of FIG. 5. In this manner, method 600 provides a way for a modem processor to match a set of observed parameters of a potential network access point to a corresponding set of expected parameters for a profile in the profile database.

Figure 7:
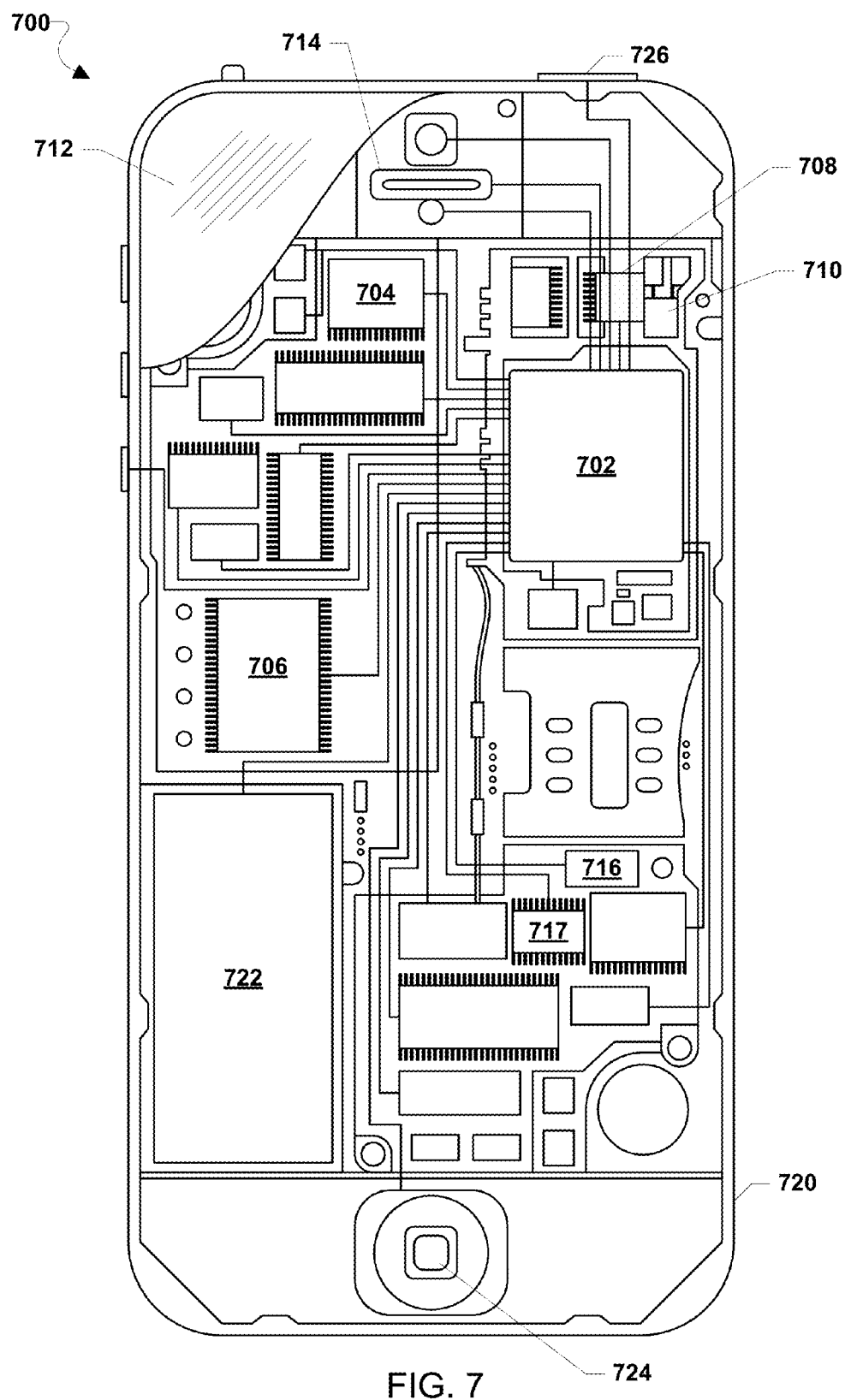
FIG. 7 is a component block diagram of a mobile communication device suitable for implementing some aspect methods.

Various aspects may be implemented in any of a variety of mobile communication devices, an example of which (e.g., mobile communication device 700) is illustrated in FIG. 7. With reference to FIGS. 1-7, the mobile communication device 700 may be similar to the mobile communication devices 110, 120, 200 as described. As such, the mobile communication device 700 may implement the methods 500 and 600 according to the various aspects.

The mobile communication device 700 may include a processor 702 coupled to a touchscreen controller 704 and an internal memory 706. The processor 702 may be one or more multi-core integrated circuits designated for general or specific processing tasks. The internal memory 706 may be volatile or non-volatile memory, and may also be secure and/or encrypted memory, or unsecure and/or unencrypted memory, or any combination thereof. The touchscreen controller 704 and the processor 702 may also be coupled to a touchscreen panel 712, such as a resistive-sensing touchscreen, capacitive-sensing touchscreen, infrared sensing touchscreen, etc. Additionally, the display of the mobile communication device 700 need not have touch screen capability.

The mobile communication device 700 may have one or more cellular network transceivers 708 coupled to the processor 702 and to one or more antennas 710 and configured for sending and receiving cellular communications. The one or more transceivers 708 and the one or more antennas 710 may be used with the above-mentioned circuitry to implement various aspect methods. The mobile communication device 700 may include one or more SIM cards 716 coupled to the transceiver 708 and/or the processor 702 and may be configured as described above. The mobile communication device 700 may include a modem processor 717 that enables the one or more transceivers 708 and the one or more antennas 710 to implement one or more radio access technologies. The modem processor 717 may also be coupled to the processor 702 and the memory 706.

The mobile communication device 700 may also include speakers 714 for providing audio outputs. The mobile communication device 700 may also include a housing 720, constructed of a plastic, metal, or a combination of materials, for containing all or some of the components discussed herein. The mobile communication device 700 may include a power source 722 coupled to the processor 702, such as a disposable or rechargeable battery. The rechargeable battery may also be coupled to the peripheral device connection port to receive a charging current from a source external to the mobile communication device 700. The mobile communication device 700 may also include a physical button 724 for receiving user inputs. The mobile communication device 700 may also include a power button 726 for turning the mobile communication device 700 on and off.

The foregoing method descriptions and the process flow diagrams are provided merely as illustrative examples and are not intended to require or imply that the operations of various aspects must be performed in the order presented. As will be appreciated by one of skill in the art the order of operations in the foregoing aspects may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the aspects disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present aspects.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configurations. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include random access memory (RAM), read only memory (ROM), electrically erasable programmable read only memory (EEPROM), FLASH memory, compact disc read only memory (CD-ROM) or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed aspects is provided to enable any person skilled in the art to make or use the claims. Various modifications to these aspects will be readily apparent to those skilled in the art, and the generic principles defined herein may be applied to some aspects without departing from the scope of the claims. Thus, the present disclosure is not intended to be limited to the aspects shown herein but is to be accorded the widest scope consistent with the following claims and the principles and novel features disclosed herein.

What is claimed is:

1. A method for profiling access points by a mobile communication device comprising a modem controlling a first radio access technology (RAT) and a second RAT, the method comprising:

establishing, by the modem, a first level of communications with an available network access point over a local area network using the second RAT;

obtaining, by the modem, from the available network access point a first set of observed parameters of the available network access point through the first level of communications;

determining, by the modem, whether the first set of observed parameters of the available network access point matches a stored profile of a network access point; and establishing, by the modem, a second level of communications with the available network access point over the local area network using the second RAT in response to determining that the first set of observed parameters matches the stored profile of the network access point.

2. The method of claim 1, wherein:
the first level of communications comprises communication between only the modem and the available network access point; and
the second level of communications comprises communication between an application or operating system executing on the mobile communication device and the available network access point.

3. The method of claim 1, further comprising restricting, by the modem, access to the available network access point in response to determining that the first set of observed parameters does not match the stored profile of the network access point.

4. The method of claim 1, further comprising:
obtaining, by the modem, a second set of observed parameters of the available network access point through the second level of communications;
determining, by the modem, whether the second set of observed parameters matches the stored profile of the network access point; and
establishing, by the modem, a third level of communications with the available network access point over the local area network using the second RAT in response to determining that the second set of observed parameters matches the stored profile of the network access point.

5. The method of claim 4, wherein obtaining a second set of observed parameters of the available network access point through the second level of communications is triggered by a change in behavior by the available network access point.

6. The method of claim 4, further comprising restricting, by the modem, access to the available network access point in response to determining that the second set of observed parameters does not match the stored profile of the network access point.

7. The method of claim 1, further comprising accessing, by the modem, the stored profile of the network access point from a profile database that stores a plurality of profiles of expected parameters for different network access points,
wherein determining whether the first set of observed parameters matches a stored profile of a network access point comprises:
selecting a first profile from the plurality of profiles of expected parameters for different network access points based on an identifier of the available network access point; and
comparing the first set of observed parameters to a corresponding set of expected parameters in the first profile.

8. The method of claim 7, further comprising updating, by the modem, the profile database based on the first set of observed parameters.

9. The method of claim 7, wherein the profile database is stored on the mobile communication device.

10. The method of claim 1, wherein the stored profile of the network access point include at least one of a access point name, round trip time, a rate switch mode, a security configuration, a firewall configuration, a network access configuration, a supported technology, an operational parameter, a channel characteristic, an environmental characteristic, response delay, processing time, and an up-time.

11. The method of claim 1, wherein:
the first RAT is configured to communicate with a wide area network and the second RAT is configured to communicate with the local area network;
communications with a wide area wireless network are maintained using the first RAT at least until the second level of communications is established with the available network access point via the second RAT; and
the second RAT is used by the modem to obtain the first set of observed parameters of the available network access point through the first level of communications.

12. The method of claim 1, further comprising generating, by the modem, a behavior vector based on the obtained first set of observed parameters of the available network access point;
wherein determining, by the modem, whether the first set of observed parameters of the available network access point matches the stored profile of a network access point comprises applying the behavior vector to a classifier model that is based on the stored profile of the network access point.

13. A mobile communication device, comprising:
a memory;
a radio frequency (RF) resource supporting a first radio access technology (RAT) and a second RAT; and
a modem coupled to the RF resource, the modem configured with processor-executable instructions to perform operations comprising:
establishing a first level of communications with an available network access point over a local area network using the second RAT;
obtaining from the available network access point a first set of observed parameters of the available network access point through the first level of communications;
determining whether the first set of observed parameters of the available network access point matches a stored profile of a network access point; and
establishing a second level of communications with the available network access point over the local area network using the second RAT in response to determining that the first set of observed parameters matches the stored profile of the network access point.

14. The mobile communication device of claim 13, wherein:
the first level of communications comprises communication between only the modem and the available network access point; and
the second level of communications comprises communication between an application or operating system executing on the mobile communication device and the available network access point.

15. The mobile communication device of claim 13, wherein the modem is configured with processor-executable instructions to perform operations further comprising restricting access to the available network access point in response to determining that the first set of observed parameters does not match the stored profile of the network access point.

16. The mobile communication device of claim 13, wherein the modem is configured with processor-executable instructions to perform operations further comprising:

obtaining a second set of observed parameters of the available network access point through the second level of communications;

determining whether the second set of observed parameters matches the stored profile of the network access point; and establishing a third level of communications with the available network access point over the local area network using the second RAT in response to determining that the second set of observed parameters matches the stored profile of the network access point.

17. The mobile communication device of claim 16, wherein the modem is configured with processor-executable instructions to perform operations such that obtaining a second set of observed parameters of the available network access point through the second level of communications is triggered by a change in behavior by the available network access point.

18. The mobile communication device of claim 16, wherein the modem is configured with processor-executable instructions to perform operations further comprising restricting access to the available network access point in response to determining that the second set of observed parameters does not match the stored profile of the network access point.

19. The mobile communication device of claim 13, wherein the modem is configured with processor-executable instructions to perform operations further comprising accessing the stored profile of the network access point from a profile database that stores a plurality of profiles of expected parameters for different network access points, and
wherein the modem is configured with processor-executable instructions to perform operations such that determining whether the first set of observed parameters matches the stored profile of a network access point comprises:
selecting a first profile from the plurality of profiles of expected parameters for different network access points based on an identifier of the available network access point; and
comparing the first set of observed parameters to a corresponding set of expected parameters in the first profile.

20. The mobile communication device of claim 19, wherein the modem is configured with processor-executable instructions to perform operations further comprising updating the profile database based on the first set of observed parameters.

21. The mobile communication device of claim 19, wherein the profile database is stored on the mobile communication device.

22. The mobile communication device of claim 13, wherein the modem is configured with processor-executable instructions to perform operations such that the stored profile of the network access point include at least one of an access point name, round trip time, a rate switch mode, a security configuration, a firewall configuration, a network access configuration, a supported technology, an operational parameter, a channel characteristic, an environmental characteristic, response delay, processing time, and an up-time.

23. The mobile communication device of claim 13, wherein the first RAT is configured to communicate with a wide area network and the second RAT is configured to communicate with the local area network, and
wherein the modem is configured with processor-executable instructions to perform operations such that:
communications with a wide area wireless network are maintained using the first RAT at least until the second level of communications is established with the available network access point via the second RAT; and
the second RAT is used by the modem to obtain the first set of observed parameters of the available network access point through the first level of communications.

24. The mobile communication device of claim 13, wherein the modem is configured with processor-executable instructions to perform operations further comprising generating a behavior vector based on the obtained first set of observed parameters of the available network access point, and
wherein the modem is configured with processor-executable instructions to perform operations such that determining whether the first set of observed parameters of the available network access point matches the stored profile of a network access point comprises applying the behavior vector to a classifier model that is based on the stored profile of the network access point.

25. A non-transitory processor-readable storage medium having stored thereon processor-executable instructions configured to cause a modem of a mobile communication device to perform operations comprising:
establishing a first level of communications with an available network access point over a local area network using a radio access technology (RAT);
obtaining from the available network access point a first set of observed parameters of the available network access point through the first level of communications;
determining whether the first set of observed parameters of the available network access point matches a stored profile of a network access point; and
establishing a second level of communications with the available network access point over the local area network using the RAT in response to determining that the first set of observed parameters matches the stored profile of the network access point.

26. The non-transitory processor-readable storage medium of claim 25, wherein the stored processor-executable instructions are configured to cause a modem of the mobile communication device to perform operations further comprising restricting access to the available network access point in response to determining that the first set of observed parameters does not match the stored profile of the network access point.

27. The non-transitory processor-readable storage medium of claim 25, wherein the stored processor-executable instructions are configured to cause a modem of the mobile communication device to perform operations further comprising:
obtaining a second set of observed parameters of the available network access point through the second level of communications;
determining whether the second set of observed parameters matches the stored profile of the network access point; and
establishing a third level of communications with the available network access point over the local area network using the RAT in response to determining that the second set of observed parameters matches the stored profile of the network access point.

28. A mobile communication device, comprising:
- means for establishing a first level of communications with an available network access point over a local area network using a radio access technology (RAT);
- means for obtaining from the available network access point a first set of observed parameters of the available network access point through the first level of communications;
- means for determining whether the first set of observed parameters of the available network access point matches a stored profile of a network access point; and
- means for establishing a second level of communications with the available network access point over the local area network using the RAT in response to determining that the first set of observed parameters matches the stored profile of the network access point.

29. The mobile communication device of claim 28, further comprising means for restricting access to the available network access point in response to determining that the first set of observed parameters does not match the stored profile of the network access point.

30. The mobile communication device of claim 28, further comprising:
- means for obtaining a second set of observed parameters of the available network access point through the second level of communications;
- means for determining whether the second set of observed parameters matches the stored profile of the network access point; and
- means for establishing a third level of communications with the available network access point over the local area network using the RAT in response to determining that the second set of observed parameters matches the stored profile of the network access point.

* * * * *